US009141641B2

(12) United States Patent
Gaertner et al.

(10) Patent No.: US 9,141,641 B2
(45) Date of Patent: Sep. 22, 2015

(54) AGGREGATING BASED ON HIERARCHY AND SCALING INPUT

(75) Inventors: Nadine Gaertner, Speyer (DE); Holger Zendler, Heidelberg (DE); Benjamin Spieler, Mannheim (DE)

(73) Assignee: SAP SE, Walldorf (DE)

(*) Notice: Subject to any disclaimer, the term of this patent is extended or adjusted under 35 U.S.C. 154(b) by 1000 days.

(21) Appl. No.: 12/914,646

(22) Filed: Oct. 28, 2010

(65) Prior Publication Data

US 2012/0110513 A1 May 3, 2012

(51) Int. Cl.
*G06F 3/048* (2013.01)
*G06F 17/30* (2006.01)

(52) U.S. Cl.
CPC .............................. *G06F 17/30241* (2013.01)

(58) Field of Classification Search
CPC ... G06F 17/30241; G06F 3/048; G01C 21/32; G01C 21/3673; G01C 21/3635; G01C 21/3638; G06T 17/05; G06T 11/203; G06T 11/40; G06T 15/04; G06T 2210/36; G06T 3/40; G06T 9/20; G06Q 10/06375
USPC ......................................................... 715/815
See application file for complete search history.

(56) References Cited

U.S. PATENT DOCUMENTS

| 8,095,434 | B1 * | 1/2012 | Puttick et al. | 705/26.9 |
| 2007/0294642 | A1 * | 12/2007 | Kyle | 715/855 |
| 2009/0076719 | A1 * | 3/2009 | Geise et al. | 701/200 |
| 2009/0216808 | A1 * | 8/2009 | Wallace | 707/104.1 |

OTHER PUBLICATIONS

Guo, D, et al, "ICEAGE: Interactive Clustering and Exploration of Large and High-Dimensional Geodata", GeoInformatica 7:3, 2003, pp. 229-253.

Jaffe, A, et al, "Generating Summaries for Large Collections of Geo-Referenced Photographs", WWW 2006, May 23-26, 2006, 2 pages.
Masutani, O., et al, "An Event Detection Method Using Floating Car Data", Intelligent Car Frontier, Denso IT Lab, 2009, 17 pages.
Masutani, O., et al, "BEIRA: A Geo-Semantic Clustering Method for Area Summary", Proceedings of the 8th International Conference on Web Information Systems Engineering, 2007, 26 pages.
Masutani, O., et al, "BEIRA: An Area-Based User Interface for Map Services", World Wide Web, vol. 12, 2009, pp. 51-68.
"Lufthansa—Find My Flight", retrieved on Oct. 28, 2010 from http://www.lufthansa.com/online/portal/lh/de/booking/affinity?l=en&blt_p=DE&blt_l=en&blt_t=Specials&blt_e=Key%20Visual&blt_n=Top%20Flight%20Offers%20l%20Flight%20Dea&blt_z=Top%20Flight%20Offers%20l%20Flight%20Dea&blt_c=DEA, 5 pages.

* cited by examiner

*Primary Examiner* — Boris Pesin
*Assistant Examiner* — Ayesha Huertas Torres
(74) *Attorney, Agent, or Firm* — Brake Hughes Bellermann LLP

(57) ABSTRACT

According to an example embodiment, a method may include accessing, by at least one processor from at least one non-transitory computer-readable memory device, a map and a hierarchy of places included in the map. The method may also include accessing, by the at least one processor from the at least one non-transitory computer-readable memory device, quantitative information associated with places in the hierarchy. The method may also include receiving a scaling input from a user. The method may also include determining, by the at least one processor, a level in the hierarchy at which to aggregate the quantitative information, based on the scaling input. The method may also include aggregating, by the at least one processor, the quantitative information for a plurality of the places at the determined level, the aggregating including independently aggregating the quantitative information associated with places below at least two of the plurality of places at the determined level. The method may also include generating, by the at least one processor, graphical data configured to display the map.

18 Claims, 11 Drawing Sheets

| State 402 | City 404 | Invitations 406A |
|---|---|---|
| New York | New York | 3 |
|  | Albany | 1 |
| New Jersey | Atlantic City | 1 |
| Pennsylvania | Philadelphia | 4 |
|  | Harrisburg | 2 |
|  | Scranton | 1 |
|  | Pitsburg | 3 |
| North Corolina | Raleigh | 3 |
|  | Charlotte | 3 |
|  | Willington | 2 |
| Ohio | Cleveland | 1 |
|  | Cincinnati | 1 |
| Kentucky | Louisville | 1 |
| Michigan | Detroit | 2 |
| Wisconsin | Madison | 1 |

FIG. 4A

| State 402 | Invitations 406B |
|---|---|
| New York | 4 |
| New Jersey | 1 |
| Pennsylvania | 10 |
| North Corolina | 8 |
| Ohio | 2 |
| Kentucky | 1 |
| Michigan | 2 |
| Wisconsin | 1 |

FIG. 4B

AGGREGATING BASED ON HIERARCHY AND SCALING INPUT

TECHNICAL FIELD

This description relates to aggregating and displaying information.

BACKGROUND

Raw data may be difficult for humans to interpret. To ease interpretation, the data may be presented to users visually or graphically. For example, when data are associated with geographical locations, the data may be presented on a map, so that a user may easily associate the data with their associated locations.

When data are associated with multiple locations, the display may become cluttered when multiple data points are displayed, rendering interpretation of the data difficult. To reduce the cluttering, the data may be aggregated into clusters, whereby data from nearby locations on the map are aggregated into one location on the map. However, this aggregation of data from nearby locations may result in loss of information regarding data associated with locations which are geographically close to each other, but have significant differences, such as different regulatory environments caused by locations within different political jurisdictions.

SUMMARY

According to an example embodiment, a method may include accessing, by at least one processor from at least one non-transitory computer-readable memory device, a map and a hierarchy of places included in the map. On the map, places at a same level in the hierarchy may be non-overlapping with each other, and places in a lower level of the hierarchy are bounded by places in a higher level of the hierarchy. The method may also include accessing, by the at least one processor from the at least one non-transitory computer-readable memory device, quantitative information associated with places in the hierarchy. The method may also include receiving a scaling input from a user. The method may also include determining, by the at least one processor, a level in the hierarchy at which to aggregate the quantitative information, based on the scaling input. The method may also include aggregating, by the at least one processor, the quantitative information for a plurality of the places at the determined level, the aggregating including independently aggregating the quantitative information associated with places below at least two of the plurality of places at the determined level. The method may also include generating, by the at least one processor, graphical data configured to display the map. The displayed map may include at least a portion of the plurality of places for which the quantitative information was aggregated, and an indication of the aggregated quantitative information for at least two of the plurality of places.

According to another example embodiment, a computer program product may comprise a non-transitory computer readable storage medium comprising instructions that, when executed by at least one processor, cause a computing apparatus to access a map and a hierarchy of places included in the map, wherein, on the map, places at a same level in the hierarchy are non-overlapping with each other; and places in a lower level of the hierarchy are bounded by places in a higher level of the hierarchy; access quantitative information associated with the places in the hierarchy; receive a scaling input from a user; determine a level in the hierarchy at which to aggregate the quantitative information, based on the scaling input; aggregate the quantitative information for a plurality of the places at the determined level, the aggregating including independently aggregating the quantitative information associated with places below at least two of the plurality of places at the determined level; and generate graphical data configured to display the map, the displayed map including at least a portion of the plurality of places for which the quantitative information was aggregated, and an indication of the aggregated quantitative information for at least two of the plurality of places.

According to another example embodiment, an apparatus may include at least one input device configured to receive input from a user, at least one output device configured to provide a display output to the user, at least one processor, and at least one memory device. The at least one memory device may comprise computer-executable instructions stored thereon that, when executed by the at least one processor, are configured to cause the apparatus to access a map and a hierarchy of places included in the map, wherein on the map, places at a same level in the hierarchy are non-overlapping with each other, and places in a lower level of the hierarchy are bounded by places in a higher level of the hierarchy; access quantitative information associated with the places in the hierarchy; receive a scaling input from the user via the at least one input device; determine a level in the hierarchy at which to aggregate the quantitative information, based on the scaling input; aggregate the quantitative information for a plurality of the places at the determined level, the aggregating including independently aggregating the quantitative information associated with places below at least two of the plurality of places at the determined level; and display the map to the user via the at least one output device, the displayed map including at least a portion of the plurality of places for which the quantitative information was aggregated, and an indication of the aggregated quantitative information for at least two of the plurality of places.

The details of one or more implementations are set forth in the accompanying drawings and the description below. Other features will be apparent from the description and drawings, and from the claims.

BRIEF DESCRIPTION OF THE DRAWINGS

FIG. 4A is a diagram showing information associated with cities according to an example embodiment.

FIG. 4B is a diagram showing information aggregated for states according to an example embodiment.

DETAILED DESCRIPTION

Figure 1:
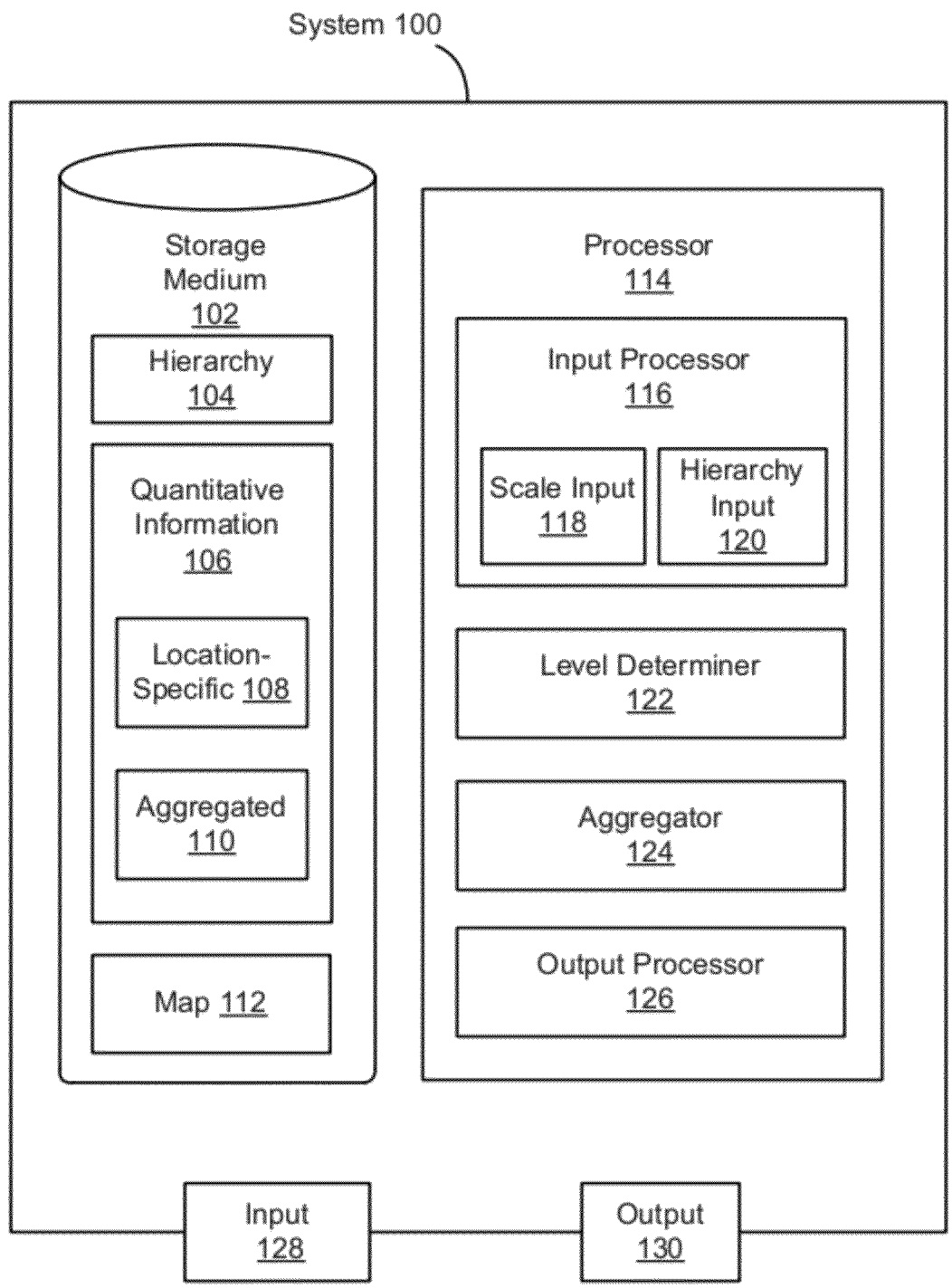
FIG. 1 is a block diagram of a system according to an example embodiment.

FIG. 1 is a block diagram of a system 100 according to an example embodiment. The system 100 may be capable of receiving input, processing data, storing data, accessing the data, and providing output. The system 100 may include, for example, a personal computer, a laptop, a notebook, a personal digital assistant (PDA), a server, or other computing device, or combinations thereof.

Figure 2A:
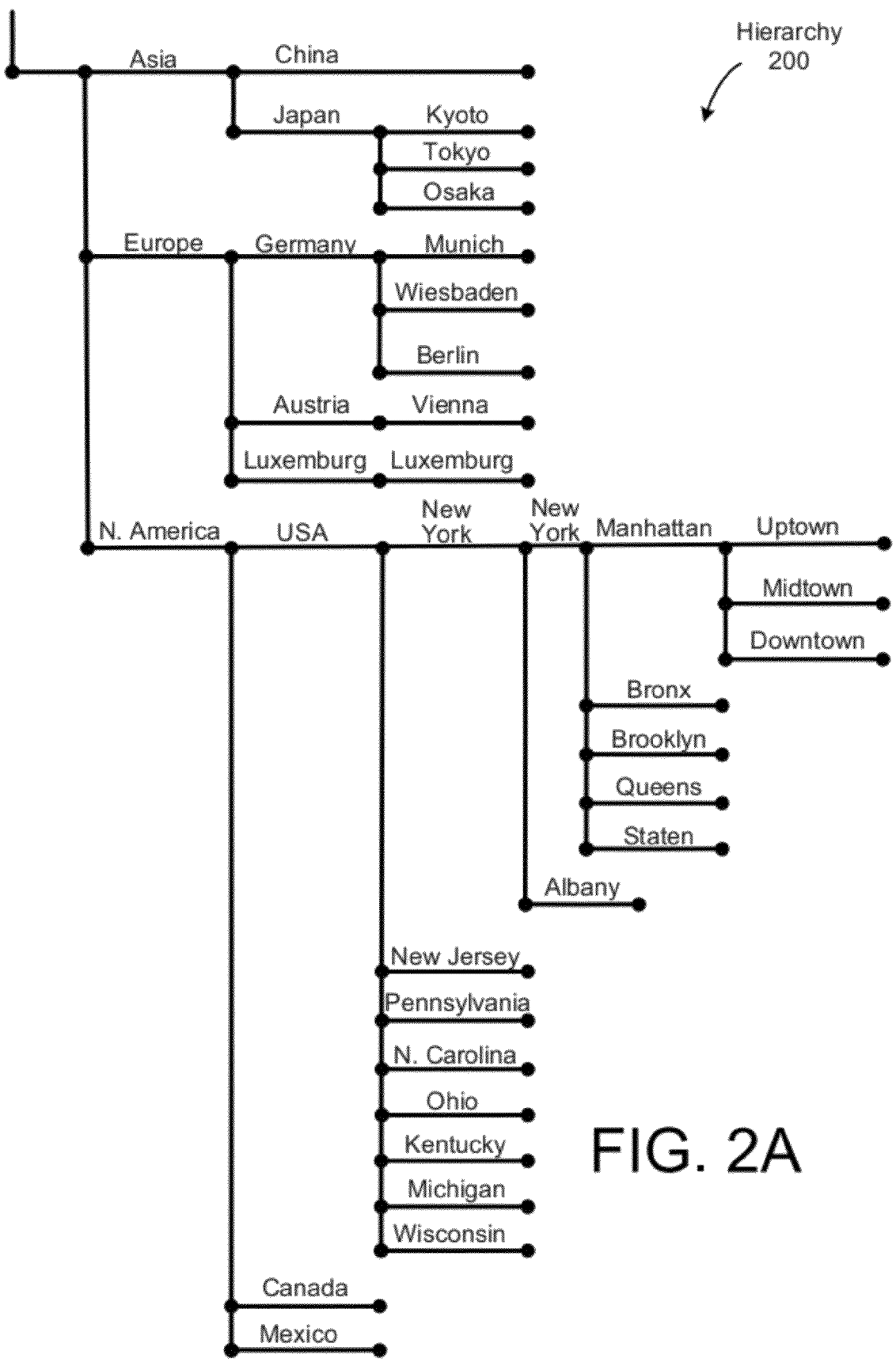
FIG. 2A is a diagram of a hierarchy according to an example embodiment.
Figure 2B:
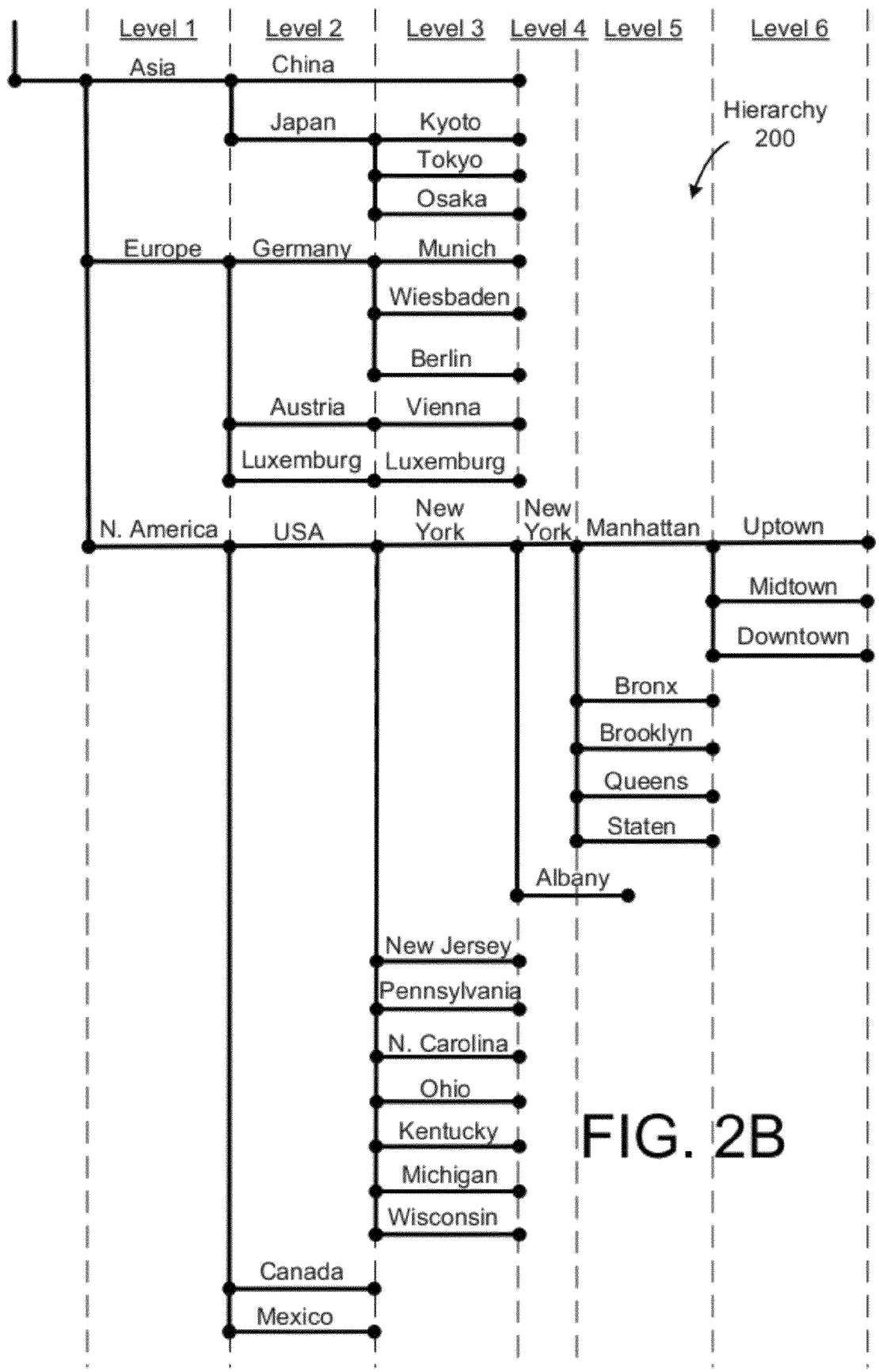
FIG. 2B is another diagram of the hierarchy according to an example embodiment.
Figure 2C:
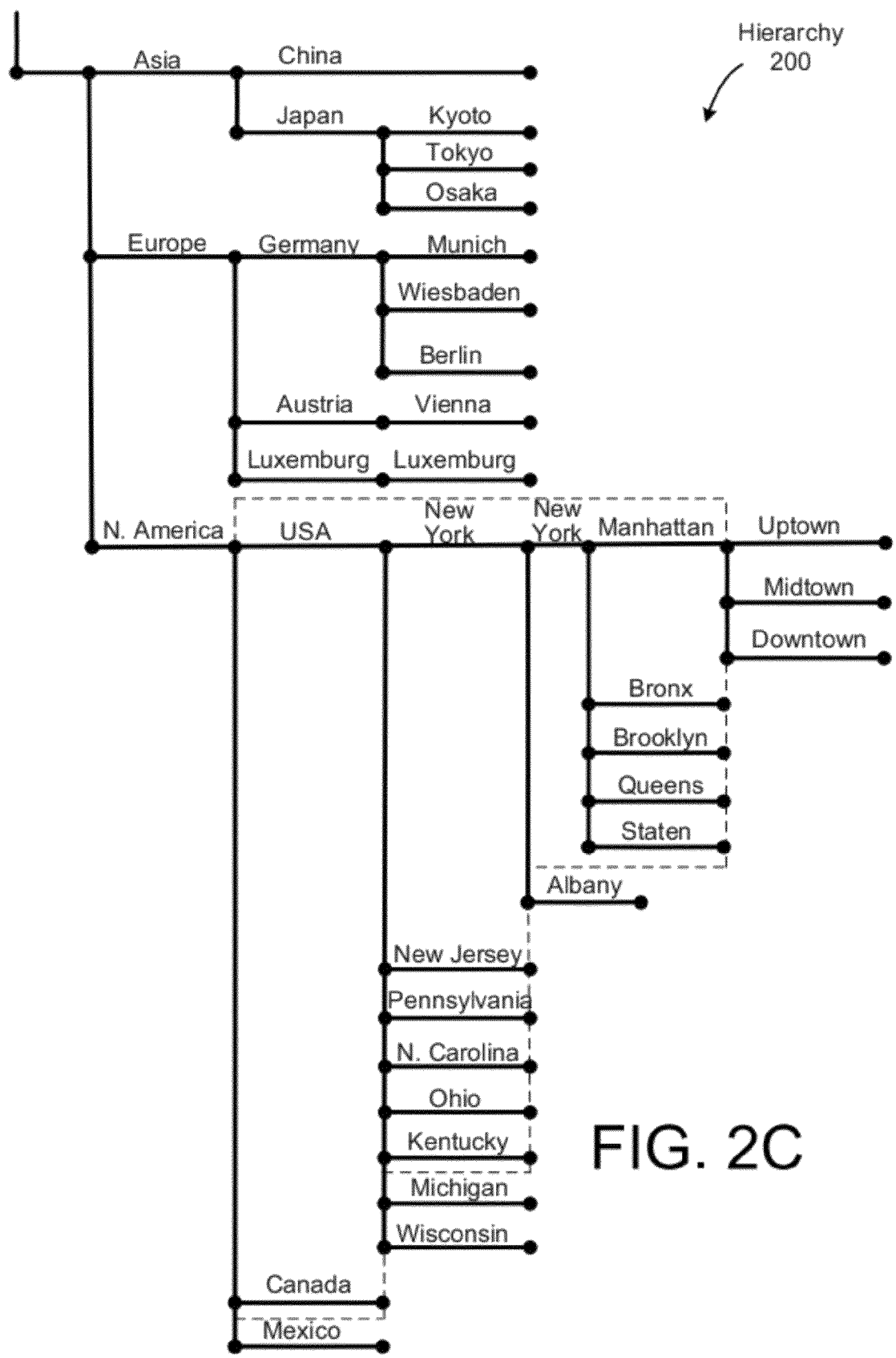
FIG. 2C is another diagram of the hierarchy according to an example embodiment.

The system 100 may include a non-transitory, computer-readable storage medium 102. The storage medium 102 may include memory capable of storing data and/or instructions executable by a processor. The instructions stored by the storage medium 102 may be executed by a processor (discussed below). The data stored in the storage medium 102 may include objects or entities with hierarchical relationships and quantitative information associated therewith. The objects or entities stored in the storage medium 102 may be associated with each other, for example, based on a hierarchy 104, a specific example of which is shown in FIGS. 2A, 2B, and 2C.

Figure 3:
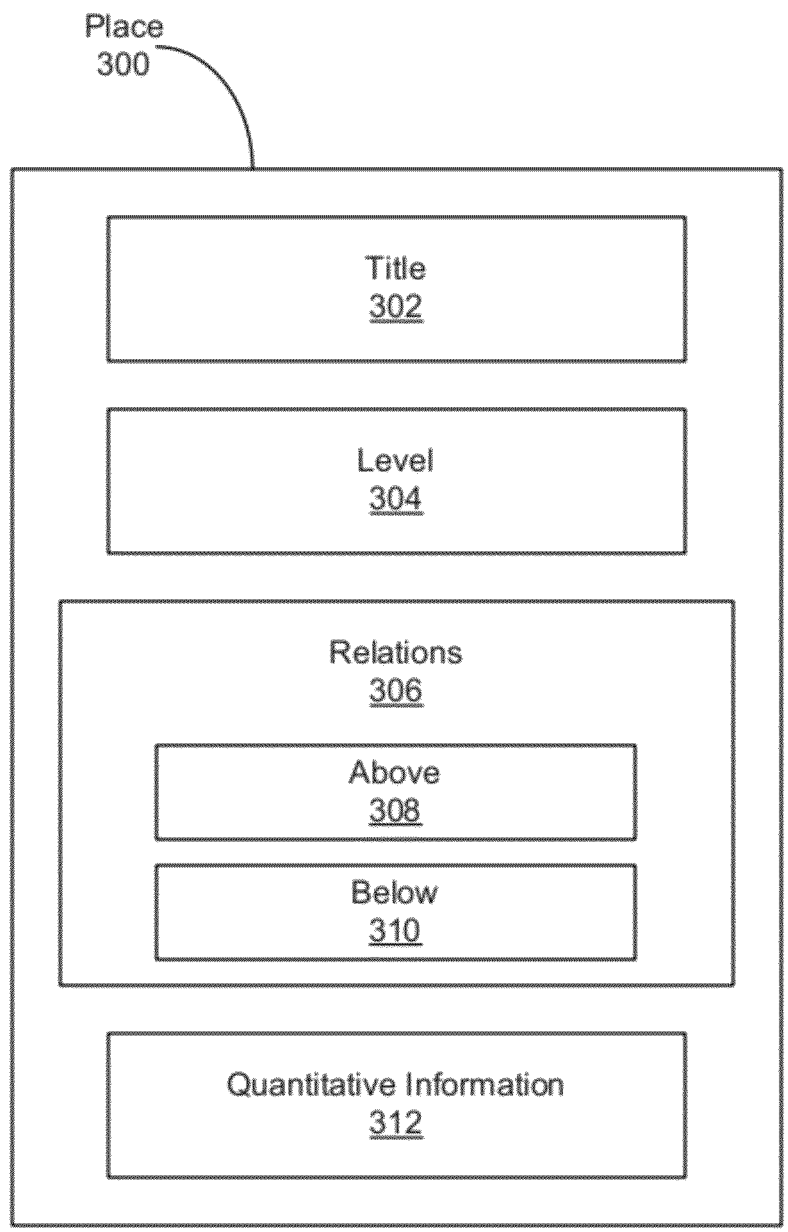
FIG. 3 is an object diagram of a place according to an example embodiment.

The hierarchy 104 may store relationships between places. Places may be included in places above them in the hierarchy 104, and may include places below them in the hierarchy 104. As used herein, "places" may refer to data objects or entities with geographic attributes, an example of which is shown in FIG. 3 and discussed in further detail below with respect thereto. The geographic attributes of the places may be associated with, or map to, a map, as is also discussed further below. A place's level in the hierarchy 104 may be considered an attribute or property of the place. For example, the level attribute or property of the places Asia, Europe, and North America may have the value, "continent". The level attribute or property of the places, China, Japan, Germany, Austria, Luxemburg, USA, Canada, and Mexico, may have the value, "country". The level attribute or property of the places, New York, New Jersey, Pennsylvania, North Carolina, Ohio, Kentucky, Michigan, and Wisconsin, may have the value, "state."

The storage medium 102 may also store quantitative information 106. The quantitative information may include data capable of having meaningful mathematical operations perform on them, such as addition or summing, multiplication, division, or determining an average (e.g., mean, median, or mode).

The quantitative information 106 may include location-specific data 108. The location-specific data 108 may include data associated with specific locations or places. For example, the location-specific data 108 may include sales data, such as sales revenue or number of sales or bids, associated with a particular city, state, or country. The location-specific data 108 may be stored as objects or places within the hierarchy 104; an example of such an object or place stored in the storage medium 102 is shown in FIG. 3.

The quantitative information 106 may also include aggregated data 110. The aggregated data 110 may include aggregations of the location-specific data 108, and may also be associated with places within the hierarchy 104. The aggregations may, for example, be aggregations of data for places below a place in the hierarchy 104 with which the aggregation is associated.

Figure 5A:
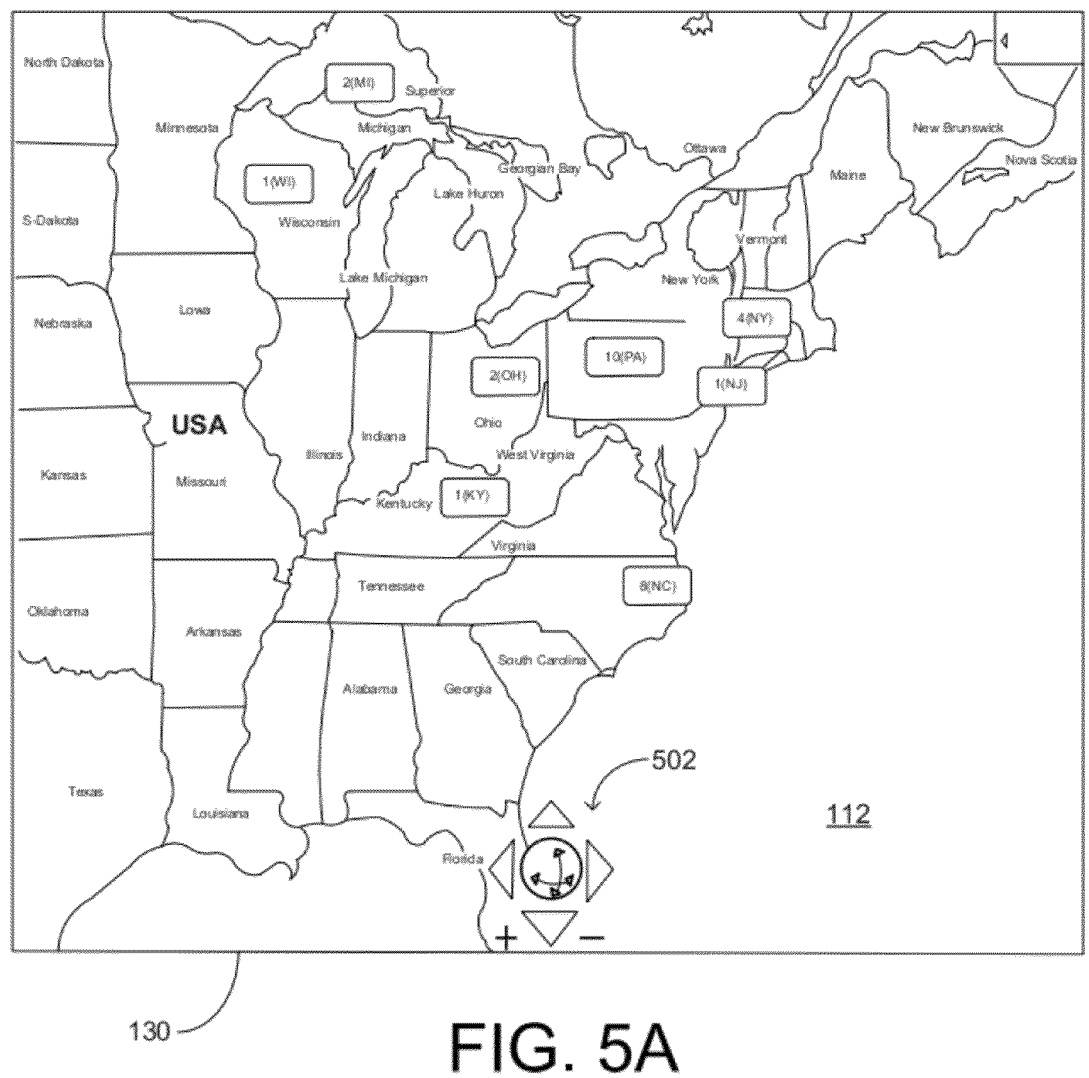
FIG. 5A shows a map with information aggregated for states according to an example embodiment.
Figure 5B:
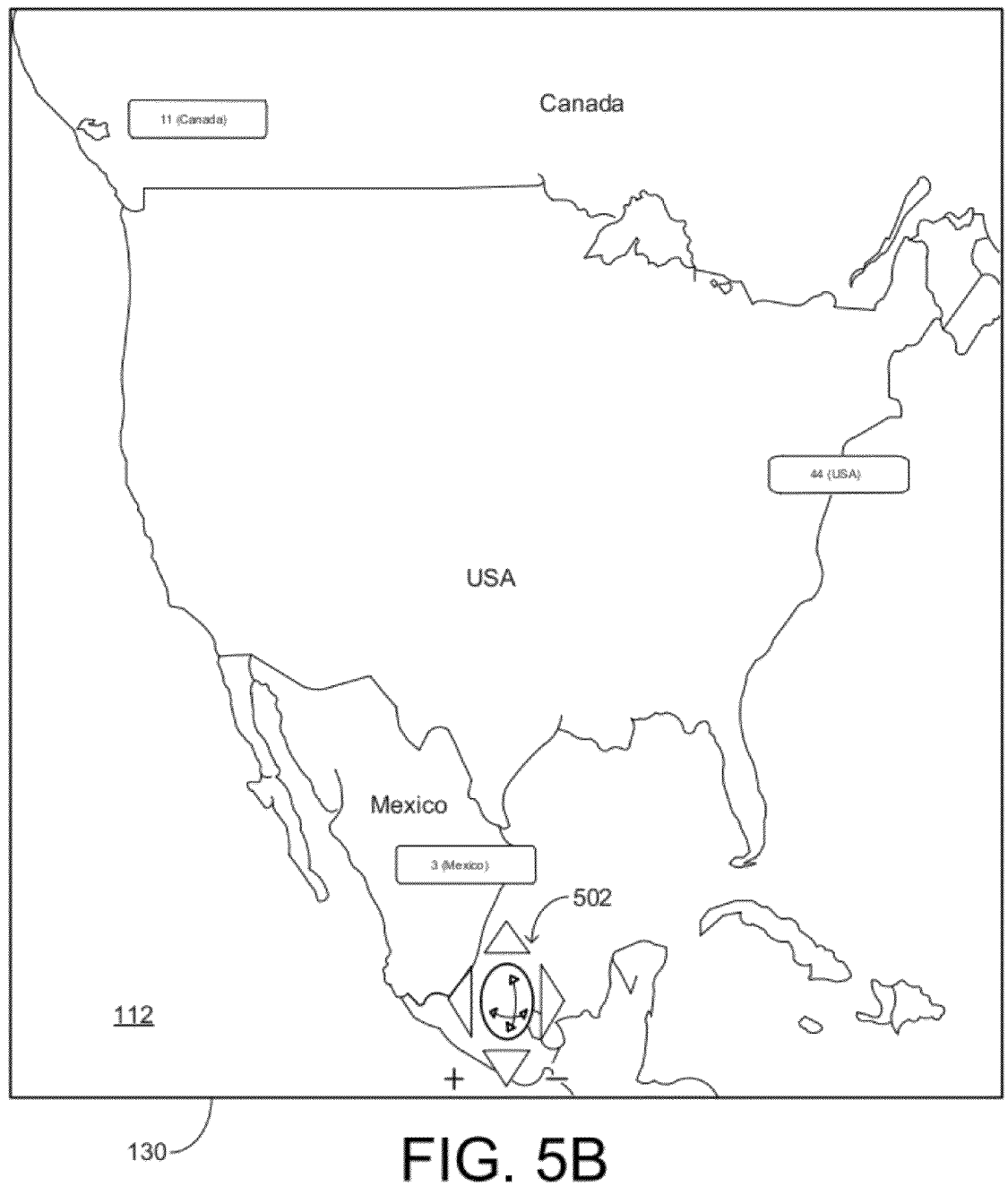
FIG. 5B shows a map with information aggregated for countries according to an example embodiment.

The storage medium 102 also may include and/or store a map 112. Places within the hierarchy 104 may be associated with places on the map 112. FIGS. 5A and 5B show examples of portions of the map 112 which may be stored in the storage medium 102, and are discussed in more detail, below.

The places on the map 112 may include boundaries surrounding the places, or the places may include point locations. The boundaries surrounding the places need not be continuous, and some parts of a place may not be contiguous with other parts of the place. For example, the country United States (or USA) may include separate bounded areas, namely, the state of Alaska, the state of Hawaii, and the "lower forty-eight" states. Similarly, the country Germany comprises the enclave Büsingen, which in view of administration belongs to the country Germany, but in view of its location, it is surrounded by Switzerland; thus, Büsingen is not contiguous with other parts of Germany.

Places in a higher level of the hierarchy 104 may include all of the places directly below them in the hierarchy 104, and places in a lower level of the hierarchy 104 may be included in all of the places directly above them in the hierarchy 104. For example, USA may include New York, New Jersey, Pennsylvania, North Carolina, Ohio, Kentucky, Michigan, and Wisconsin; conversely, New York, New Jersey, Pennsylvania, North Carolina, Ohio, Kentucky, Michigan, and Wisconsin may be included in USA.

Places at a same level in the hierarchy 104, whether they have a same place above them in the hierarchy 104 or not, may be non-overlapping and/or have mutually exclusive geographical areas or points. For example, the states New York, New Jersey, Pennsylvania, North Carolina, Ohio, Kentucky, Michigan, and Wisconsin may be non-overlapping, and have no geographical areas in common (although they may share borders). As another example, the continents Asia, Europe, and North America may be exclusive of each other on the map 112, and may not overlap or have any common areas. Similarly, countries within the continent North America, such as USA, Canada, and Mexico, may be mutually exclusive of each other and may not overlap with each other or have any common areas. The locations in a lower level of a hierarchy may be included in, or bounded by, locations directly above them in the hierarchy 104. For example, USA, Canada, and Mexico are included in, and bounded by, North America. Germany, Austria, and Luxemburg are all included in and bounded by Europe, and China and Japan are both included in and bounded by Asia.

In an example embodiment, each of the places may be associated with quantitative information, which may be stored in the quantitative information 106 portion of the storage medium 102, and may be associated with each place. Quantitative information may include information capable of having mathematical operations performed on it for multiple instances, such as summing the data between multiple objects or instances, or averaging the data, to provide meaningful results. For example, the quantitative information associated with each place may include sales data over certain time periods, whether in total dollar (or other currency) amounts or number of sales, number of bid invitations, or amount of warehouse capacity filled or unfilled.

The system 100 may also include a processor 114. The processor 114 may be capable of executing instructions and processing input. The processor 114 may access the data stored in the storage medium 102, such as the hierarchy 104, quantitative information 106, and/or map 112; the processor 114 may access the stored data during run-time, for example. While the processor 114 shown in FIG. 1 includes modules which each perform specified functions, the processor 114 may include a general purpose processor which performs the functions of these modules after loading a computer software program.

The system 100 may include an input 128. The input 128 may, for example, receive input from a user, such as scaling inputs or shifting inputs. The scaling inputs may include zoom level inputs which cause the displayed map to zoom in or out; thus, a user may provide a zoom input to show a larger part of a map at a smaller scale, or a smaller part of a map at a larger scale. The shifting inputs may allow a user to look at different parts of the map 112 at the same zoom level. The input 128 may, for example, include a mouse which allows the user to drag the map 112 up, down, to the left, or to the right within the screen, and to push 'zoom in' and 'zoom out' buttons.

The processor 114 may include an input processor 116. The input processor 116 may process the input received at the input 128. The input processor 116 may include a scale input processor 118 and/or a hierarchy input processor 120. The scale input processor 118 may receive scaling instructions, such as to zoom in or out of the displayed map 112 (which may be stored in the map 112 portion of the storage medium 102). The scale input processor 118 may change the scale or zoom level of the displayed map based on scaling inputs received via the input 128. The hierarchy input processor 120 may receive hierarchy inputs to directly modify the level of the hierarchy 104 at which values are aggregated, which will be discussed below.

The processor 114 may also include a level determiner 122. The level determiner 122 may determine a level in the hierarchy 104 at which to aggregate quantitative information and/or values based on the input. The level determiner 122 may determine at what level to aggregate the information based on the input processed by the scale input 118, such as the zoom input.

The determination of what level to aggregate the quantitative information may be based on a number of different techniques. The level determiner 122 may determine how much to aggregate the quantitative information based at least in part on the zoom level or the scale of the map, and/or based on which places are displayed on the map 112 to the user. For example, the level determiner 122 may determine a level at which at least a portion of a threshold number of places, such as a portion of at least two states, or at least three states, or any other threshold number of places at a certain level in the hierarchy 104 are shown on the output of the map 112. For example, if at least a threshold number of (such as two or three) states, or a portion thereof, are displayed on the map, then the level determiner 122 may determine that the quantitative information should be aggregated at the state level. However, if fewer than the threshold number of states are displayed on the map, then the level determiner 122 may determine that the quantitative information should be aggregated at a lower level, such as a city or county level, if the threshold number of cities or counties are displayed, or even a lower level, such a borough or neighborhood.

For example, in FIG. 5A, the displayed map 112 shows multiple states within the USA, but only a portion of the USA and Canada, and none of Mexico. Thus, the level determiner 122 may determine to aggregate at the state level. In FIG. 5B, the displayed map shows USA, Canada, and Mexico, which may result in the level determiner 122 determining to aggregate at the country level.

In another example, the user may directly control the level of the hierarchy 104 at which the aggregation is performed, such as by providing input processed by the hierarchy input processor 120. For example, the output node 130 may provide a graphical user interface (GUI) via which the user may select or control the level of the hierarchy 104 at which the aggregation is performed. In that example, the level determiner 122 may determine the level in the hierarchy 104 at which the information is to be aggregated based directly on information processed by the hierarchy input processor 120. In an example shown in and described with reference to FIG. 2B, information may be aggregated at the same level for all parts of the hierarchy 104; in an example shown in and described with reference to FIG. 2C, information may be aggregated at different levels for different levels of the hierarchy 104.

The processor 114 may also include an aggregator 124. The aggregator 124 may aggregate the information at the level determined by the level determiner 122. For example, if the level determiner 122 determined that information would be aggregated at the state level, the aggregator 124 could aggregate information for all places below each state in the hierarchy 104. Aggregating may include adding the quantitative information for all places below a given place in the hierarchy 104, or averaging (such as determining a mean, median, or mode of) all places below the given place in the hierarchy 104. In situations where some of the places to be aggregated have missing data or quantitative information, the aggregation may be performed without including the places with missing data or quantitative information. The output, discussed below, may indicate visually that some of the underlying data or quantitative information is missing, such as by indicating, "excluding data for [place]."

An example of aggregating the quantitative information at the state level is discussed below with respect to FIGS. 4A and 4B. If the level determiner determined that information should be aggregated at the country level, the aggregator 124 could aggregate information for all places below each country (for which aggregation is to be performed) in the hierarchy 104.

The system 100 may also include an output 130. The output 130 may include, for example, a display such as a monitor, cathode-ray tube, LCD screen, or LED display. The output 130 may provide output to the user based on determinations made by the processor 114.

The processor 114 may also include an output processor 126. The output processor 126 may determine the output to provide to the user via the output 130. For example, the output processor 126 may generate graphical data, such as a map, to display to the user. The map may include representations of each of the locations or places for which the information is aggregated, and an indication of the sum or other mathematical result of the aggregated information.

FIG. 2A is a diagram showing a hierarchy 200, which may be stored in the hierarchy 104 of the storage medium 102 and accessed by the processor 114, according to an example embodiment. In this example, places to the left may be considered higher in the hierarchy 200, whereas places to the right may be considered lower in the hierarchy 200. Other formats may be used, such as showing higher places closer to the top of a hierarchy, and lower places closer to the bottom of the hierarchy.

In this example, the hierarchy 200 includes continents such as Asia, Europe, and North America. Below Asia, the hierarchy 200 includes the countries China and Japan. Below Japan, the hierarchy 200 includes cities, namely Kyoto, Tokyo and Osaka.

Below Europe, the hierarchy 200 includes the countries Germany, Austria and Luxemburg. Below Germany, the hierarchy 200 includes the cities Munich, Wiesbaden, and Bonn. Below Austria, the hierarchy 200 includes the city Vienna. Below the country Luxemburg, the hierarchy 200 includes the city Luxemburg.

Below the continent North America in the hierarchy 200 are the countries USA, Canada, and Mexico. Below the country USA in the hierarchy 200 are the states New York, New Jersey, Pennsylvania, North Carolina, Ohio, Kentucky, Michigan, and Wisconsin. Below the state New York in the hierarchy 200 are the cities New York and Albany. Below the city New York in the hierarchy 200 are the boroughs, Manhattan, Bronx, Brooklyn, Queens and Staten. Below Manhattan in the hierarchy 200 are the sections, Uptown, Midtown and Downtown. While the hierarchy 200 shown in FIG. 2A shows certain countries, continents, states, cities and neighborhoods, others may be included which are not shown.

While not shown in FIG. 2A, the hierarchy 200 may include "state" or equivalent values for places below other countries in the hierarchy 200; thus, for example, while not shown, Germany may have conceptually equivalent political entities, which are lower in the hierarchy 200 than the country/place Germany, but above the cities in the hierarchy 200. The hierarchy 200 may also include places with the value, "city," for the level attribute or property, which, in the example shown in the hierarchy 200 of FIG. 2A, includes the places, Kyoto, Tokyo, Osaka, Munich, Wiesbaden, Bonn, Vienna, Luxemburg, New York, and Albany.

While the hierarchy 200 shown in FIG. 2A uses political boundaries for the hierarchy 200, i.e., divides the places based on political boundaries, other hierarchies may be included. For example, other hierarchies may additionally or alternatively separate places based on geographical or terrain features, such as mountain ranges which separate certain locations, or market features, such as connected markets, which may not be the same as political boundaries.

In another example, hierarchies may include administrative hierarchies. Administrative hierarchies in a government could include states, state capitals, counties, county seats, cities, taxing districts, school districts. Administrative hierarchies in a corporation could include regions served by certain groups within the corporation and/or salesman; in the United States Postal Service, for example, the zip codes could be the lowest place in the hierarchy, and other organizations or corporations could use zip codes as convenient geographical indicators of places.

In other examples, one level of a hierarchy may include groups of countries which are party to agreements, such as the European Union (which would include many European countries, but exclude other European countries such as Switzerland, Liechtenstein, and Monaco) and/or the North American Free Trade Agreement (which includes Canada, USA, and Mexico), or groups of countries which share a common currency (such as the Euro which would include many European countries, but exclude other European countries such as the United Kingdom, Denmark, and Sweden), or groups of countries with borders without check or the so-called Schengen area that represents a territory where the free movement of persons is guaranteed (including Germany, Switzerland, Denmark, and France, but not the United Kingdom). In these examples, the "group of countries" may be considered a "place" which is one level above the countries in the hierarchy.

FIG. 2B shows levels of the hierarchy 200 according to an example embodiment. In this example, Level 1 of the hierarchy includes the continents Asia, Europe, and North America. If Level 1, continent, was chosen for the level of aggregation, information would be aggregated for Asia, information would be aggregated for Europe, and information would be aggregated for North America. If Level 2, country, was selected as the level of aggregation, then information would be aggregated for each country on the map 112 displayed on the output 130. For example, if the map 112 showed North America, information could be aggregated for USA, aggregated for Canada, and aggregated for Mexico, an example of which is shown and discussed with reference to FIG. 5B. Moving down in the hierarchy 200, if information were aggregated at Level 3, which is state under USA, then if the map showed the country USA, information could be aggregated for each of two or more of the state New York, the state New Jersey, the state Pennsylvania, the state North Carolina, the state Ohio, the state Kentucky, the state Michigan, and the state Wisconsin, an example of which is shown in and described with reference to FIG. 5A. Similarly, at a different zoom level, information could be aggregated at the level of the city, or even neighborhoods within a city.

In another example, information could be aggregated differently at different levels of the hierarchy. This differing level of aggregation may result from user input to the hierarchy input processor 120, which may include a graphical user interface allowing the user to select different levels of the hierarchy 200 over which to aggregate the quantitative information.

FIG. 2C is a diagram showing information aggregated at different levels within the hierarchy 200. In this example, information will be aggregated for the USA and Canada. Canada does not have any places below it in the hierarchy 200 (or such levels have not been selected), so all information for Canada will be aggregated for the one place Canada. While the example hierarchy 200 shown in FIG. 2C does not show any places below the country Canada, in other examples a hierarchy could show lower-level places, but the level determiner 122 could choose not to aggregate information at the lower levels for reasons such as user selection, less available data for Canada, or the map not showing enough places in Canada.

Continuing with the example of FIG. 2C, at the state level, information may be aggregated for the states New Jersey, Pennsylvania, North Carolina, Ohio, and Kentucky, but not for the states Michigan and Wisconsin. Michigan and Wisconsin may be excluded from the aggregation because they are not shown on the map displayed to the user. For New York State, the aggregated information may be divided between New York City and the rest of New York, resulting in one sum for all of New York except New York City, and for New York City, the information may be aggregated based on borough, namely the boroughs of Manhattan, Bronx, Brooklyn, Queens, and Staten. The higher level or granularity of aggregation for New York City may be due to user choice or more information on New York City. Different levels of aggregation may be provided for different places which are deemed to be more important or more necessary to be focused on, according to an example embodiment.

FIG. 3 is an object diagram of a place 300 according to an example embodiment. The place 300 may be an object stored in the storage medium 102 and accessed by the processor 114. While certain attributes of the place 300 are shown in FIG. 3, this is merely an example. Other attributes may be included in the place 300 other than those shown in FIG. 3, and some of the attributes shown in FIG. 3 may not be included in the place 300.

The place 300 may include a title attribute 302. The title attribute 302 may refer to and/or include the name of the place 300 of location, such as Asia, Germany, New York, or Brooklyn. The title attribute 302 may include a unique nominal identifier of the object, which may be a string value; in situations where two places have the same name, such as cities with the same name, the title attribute 302 may include additional characters, such as numbers, to distinguish the place 300 from other places which have the same name. The title attribute 302 may map to or be associated with a place on the map 112.

The place 300 may also include a level attribute 304. The level attribute 304 may include an ordinal and/or integer value, and may indicate the level in the hierarchy 200 of the place 300. The level attribute 304 may include the number '1', indicating that the place 300 is a continent, the number '2', indicating that the place 300 is a country, the number '3', indicating that the place 300 is a city or U.S. state, for example. Or, the level attribute 304 may include a string value such as, "Continent," "Country," "City," or "State".

The place 300 may also include relations attribute(s) 306. The relations attribute(s) 306 may indicate other place(s) above or below the place 300 in the hierarchy 200. For example, the relations attribute(s) 306 may include an above field 308 indicating a place above the place 300 in the hierarchy 200, and a below field 310 indicating place(s) below the place 300 in the hierarchy 200. For example, the place USA may have "USA" in the title attribute 302, "2" or "Country" in the level attribute 304, "North America" in the above field 308, and "New York," "New Jersey," "Pennsylvania," "North Carolina," "Ohio," "Kentucky," "Michigan," and "Wisconsin" in the below field 310.

The place 300 may also include a quantitative information attribute 312. The quantitative information attribute 312 may include quantitative information associated with the place 300 and/or places below the place 300 in the hierarchy 200. The quantitative information attribute 312 may be the same or duplicate as quantitative information 106 stored in the storage medium 102 for the particular place 300. The quantitative information may include information such as total sales (measured in number of sales or dollars or other currency), bid opportunities, warehouse space available, or other quantitative information for which addition or summing operations would provide meaningful results. The location-specific quantitative information 108 may include the quantitative information at the lowest level of the hierarchy 200, such as the city or neighborhood, whereas the aggregated quantitative information 110 may include the sum of all the quantitative information for places below a given place in the hierarchy 200. In the place 300 object, the quantitative information 312 may include the sum of all the quantitative information for all places below the place 300 in the hierarchy 200 (such places below the place 300 should be indicated in the below field 310); for lowest-level places, the quantitative information 312 may include the quantitative information for the given place 300.

FIG. 4A is a diagram showing values for cities in the United States in an example in which values will be aggregated at the state level. The values may, for example, include bid invitations for each of the cities. Other cities may be included in the storage medium 102 and/or hierarchy 200, but not be shown in FIG. 4A because they did not have at least one bid invitation.

FIG. 4A shows the states 402 of New York, New Jersey, Pennsylvania, North Carolina, Ohio, Kentucky, Michigan and Wisconsin. FIG. 4A shows the cities 404 New York and Albany, which are included in the state New York; Atlantic City, which is included in the state New Jersey; Philadelphia, Harrisburg, Scranton, and Pittsburgh, which are included in the state Pennsylvania; Raleigh, Charlotte, and Willington, which are included in the state North Carolina; Cleveland and Cincinnati, which are included in the state Ohio; Louisville, which is included in the state Kentucky; Detroit, which is included in the state Michigan; and Madison, which is included in the state Wisconsin.

FIG. 4A also includes quantitative information, such as bid invitations 406A. While bid invitations 406A are shown in FIG. 4A, other information may be included, such as total sales, available inventory, or any other quantitative information which may be aggregated at different levels of the hierarchy 200. In this example, New York City has three bid invitations, Albany has one bid invitation, Atlantic City has one bid invitation, Philadelphia has four invitations, Harrisburg has two invitations, Scranton has one invitation, Pittsburgh has three invitations, Raleigh has three invitations, Charlotte has three invitations, Willington has two invitations, Cleveland has one invitation, Cincinnati has one invitation, Louisville has one invitation, Detroit has two invitations, and Madison has one invitation. The number of bid invitations for New York City may have already been aggregated from the boroughs and neighborhoods.

FIG. 4B shows the invitations 406B for each state 402 after the aggregator 124 has performed the aggregation for each of the states 402. For example, based on the quantitative information shown in FIG. 4A, the aggregator 124 would determine that New York State had four invitations, New Jersey had one invitation, Pennsylvania had ten invitations, North Carolina had eight invitations, Ohio had two invitations, Kentucky had one invitation, Michigan had two invitations, and Wisconsin had one invitation. In this example, the aggregation is performed for the states by summing or adding all of the information for places (cities) below the given place (state). Other examples may include averaging the quantitative information or performing other mathematical operations on the quantitative information.

FIG. 5A shows a map with information aggregated for states according to an example embodiment. The values for the states are the same as described above in the aggregation shown in FIGS. 4A and 4B. FIG. 5A may be considered to be displaying the result of the aggregation shown in FIGS. 4A and 4B. In this example, the map 112 shows that New York has four bid invitations, New Jersey has one invitation, Pennsylvania has ten invitations, North Carolina has eight invitations, Kentucky has one invitation, Ohio has two invitations, Michigan has two invitations, and Wisconsin has one invitation. If the level determiner 122 determined to aggregate based on the country level, then the bid invitations may be aggregated on the country level, and for USA, for example, the total would be the total of all of the USA's states.

The displayed map 112 may include an input interface 502. The input interface may received zoom level inputs and/or directional inputs from the user. For example, the '+' and '−' of the input interface 502 may receive zoom in and zoom out inputs, and the directional arrows may allow the user to move the displayed map 112 along the output screen 130. If a user zooms out, the displayed map 112 may show more places 300 in less detail, and the level determiner 122 may determine that the aggregator 124 should aggregate at a higher level in the hierarchy 104, and the values may be shown for places 300 at a higher level of the hierarchy 104. Conversely, if the user zooms in, the displayed map 112 may show fewer places 300 but in greater detail, and the level determiner 112 may determine that the aggregator 124 should aggregate at a lower level in the hierarchy 104, and the values may be shown for places 300 at a lower level of the hierarchy 104.

FIG. 5B shows a map 112 with information (bid invitations) aggregated for countries according to an example embodiment. In this example, USA is shown as having forty-four bid invitations, Mexico is shown as having three bid invitations, and Canada is shown as having eleven bid invitations. If the user zoomed out, such as by clicking a zoom out button (e.g., the '−' of the input interface 502), then it is possible that the map 112 could show the continents, North America, Europe and Asia, and the information would be aggregated for all of the countries within each of those continents. It is also possible that the user could zoom in (such as by clicking the '+' button of the input interface 502) or increase the level of detail shown so that the information is aggregated on the state or city level, which could result in information being shown for each state (shown in FIG. 5A) or city which had bid invitations.

In an example embodiment, the map 112 shown on the output screen 130 may show information only for those places which have significant values, such as values greater than zero. Thus, if a state or country had no bid invitations, then no indication would be made for that state or country. This would result in less relevant information not being shown to the user.

Figure 6:
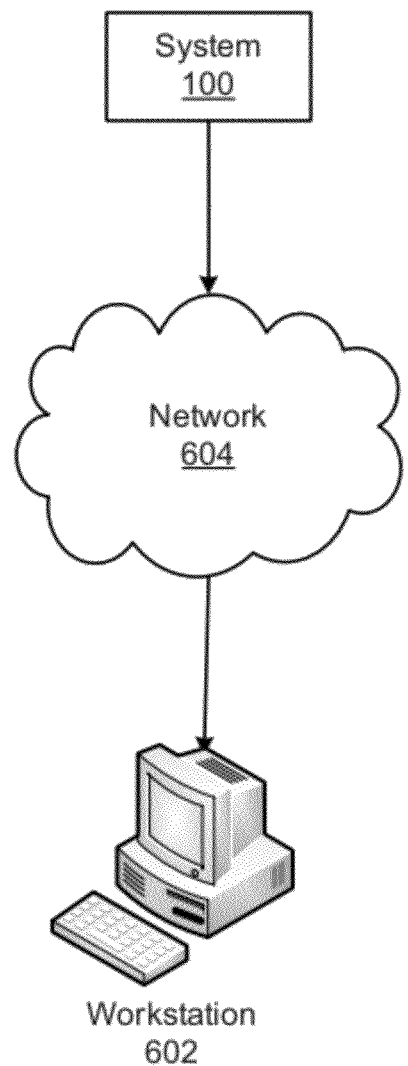
FIG. 6 is a diagram showing the system and a workstation in communication via a network according to an example embodiment.

FIG. 6 is a diagram showing the system 100 in communication with a workstation 602 via a network 604. In this example, the system 100 may receive input from a user who is working at the workstation 602, which may include a personal computer, laptop computer, smartphone, or tablet computer, as non-limiting examples. The user may provide input to the workstation 602 which may be sent to the system 100 via the network 604. The network 604 may include, for example, the Internet, a local area network (LAN), or any other network via which computing devices may communicate. The system 100 may perform the processes and/or tasks described above and provide the output to the user at the workstation 602 via the network 604. The workstation 602 may display the output, such as the map 112 and the indications of the aggregated information, to the user on the display or output 130, which may be a monitor according to an example embodiment. The user may provide zoom in and zoom out inputs, hierarchy inputs and/or shift or move the map around by using an input device such as a mouse or a keyboard, according to example embodiments.

Figure 7:
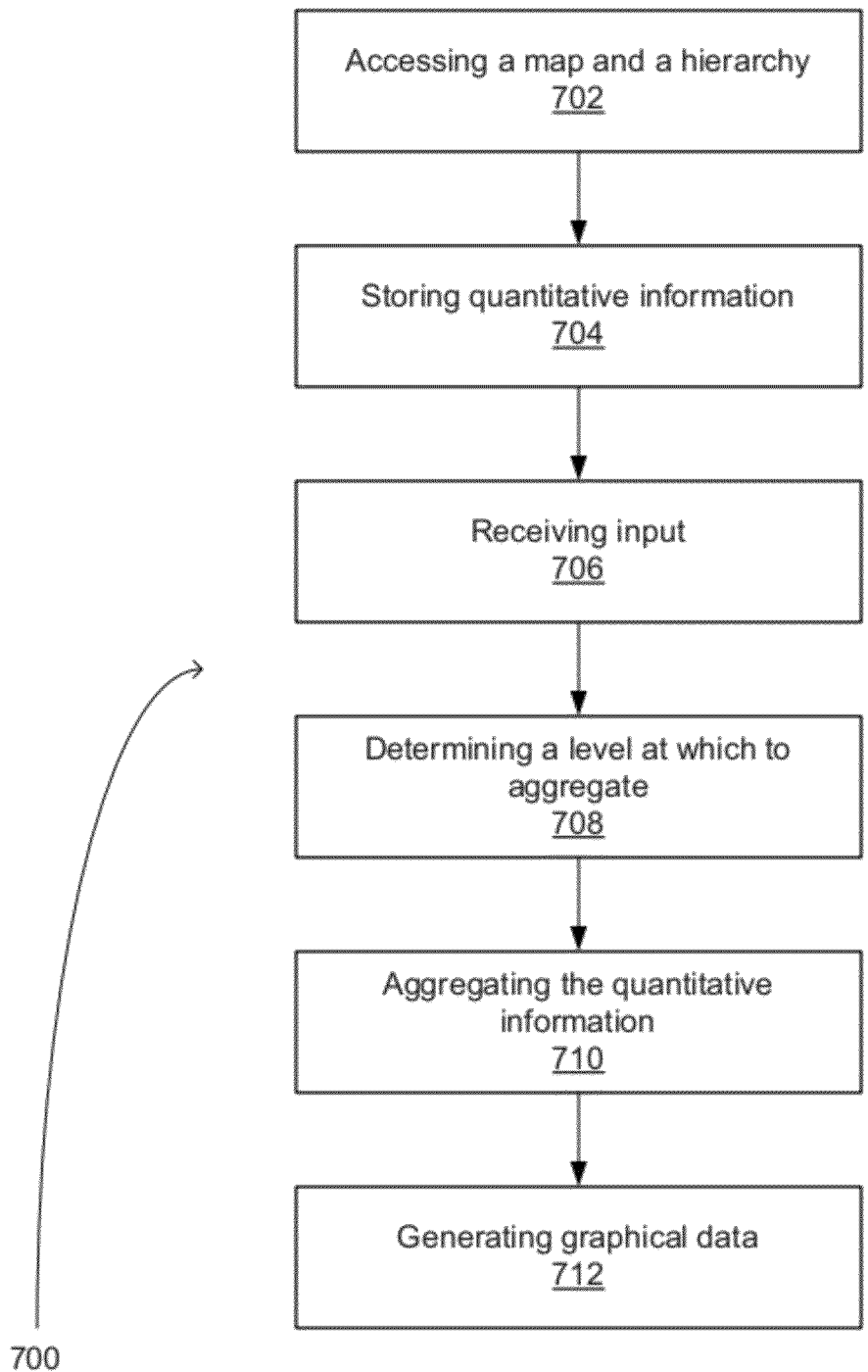
FIG. 7 is a flowchart showing a method according to an example embodiment.

FIG. 7 is a flowchart showing a method 700 according to an example embodiment. In this example, the method 700 may include storing, in or by at least one non-transitory computer-readable memory device or storage medium 102, and/or accessing by at least one processor 114, a map 112 and a hierarchy 104 of places 300 included in the map 112 (702). On the map 112, places 300 at a same level in the hierarchy 104 may be non-overlapping with each other. Also on the map 112, places 300 in a lower level of the hierarchy 104 may be bounded by places 300 in a higher level of the hierarchy 104.

The method 700 may also include storing, in or by the at least one non-transitory computer-readable memory device or storage medium 102, and/or accessing by the processor 114, quantitative information 106 associated with each of the places 300 in the hierarchy 104 (704). The method 700 may also include an input 128 receiving a scaling input from a user (706). An input processor 116 of the processor 114 may process the received input.

The method 700 may also include determining, by the at least one processor 114 in communication with the at least one memory device or storage medium 102, a level in the hierarchy 104 at which to aggregate the quantitative information 106, based on the scaling input (708). The method 700 may also include aggregating, by the at least one processor 114, the quantitative information 106 for a plurality of the places 300 at the determined level, the aggregating including independently aggregating the quantitative information 106 associated with places 300 below at least two of the plurality of places 300 at the determined level (710). The aggregating may include adding or averaging the quantitative information.

The method 700 may also include generating, by the at least one processor 114, graphical data configured to display the map 112 (712). The displayed map 112 may include at least a portion of each of the plurality of places 300 for which the quantitative information 106 was aggregated, and an indication of the aggregated quantitative information 106 for at least two of the plurality of places 300.

In an example embodiment, the storing and/or accessing the hierarchy 104 of places 300 and the storing and/or accessing the quantitative information 106 associated with each of the places 300 may include storing and/or accessing an object associated with each of the places 300. Each of the objects may include a level attribute 304 indicating a level of the place 300 within the hierarchy 104, and a quantitative information attribute 312 indicating the quantitative information 106 associated with the place 300.

In an example embodiment, the storing and/or accessing the hierarchy 106 of places 300 and the storing and/or accessing the quantitative information 106 associated with each of the places 300 may include storing and/or accessing an object associated with each of the places 300. Each of the objects may include a relations attribute 306 indicating at least one other place 300 above or below the place 300 in the hierarchy 104, and a quantitative information attribute 312 indicating the quantitative information 106 associated with the place 300.

In an example embodiment, the hierarchy 104 may be based on political boundaries on the map 112.

In an example embodiment, the places 300 may include geographic locations on the map 112.

In an example embodiment, the quantitative information 106 may include sales data.

In an example embodiment, the receiving the scaling input (706) may include receiving a zoom level input from the user via a graphical user interface 502.

In an example embodiment, the determining the level in the hierarchy 104 (708) may include determining a same level in the hierarchy 104 for all of the places 300 for which the quantitative information 106 is aggregated.

In an example embodiment, the determining the level in the hierarchy 104 (708) may include determining levels in the hierarchy 104 independently for each of the places 300 for which the quantitative information 106 is aggregated.

In an example embodiment, the aggregating (710) may include adding the quantitative information 106 for the plurality of places 300 at the determined level, the adding including independently adding the location-specific quantitative information 108 associated with places 300 below at least two of the plurality of places 300 at the determined level.

In an example embodiment, the indication of the aggregated information may include a number displayed within the portion of the place 300 on the map 112 for which the information 106 was independently aggregated.

In an example embodiment, the method 700 may further include changing, by the at least one processor 114, a scale of the displayed map 112 based on the scaling input. The determining the level in the hierarchy 104 (708) may include determining the level at which at least a portion of a threshold number of places 300 are displayed on the map 112.

In an example embodiment, the method 700 may further include changing, by the at least one processor 114, a scale of the displayed map 112 based on the scaling input. The determining the level in the hierarchy 104 (708) may include determining the level at which at least a portion of at least two places 300 are displayed on the map 112.

In an example embodiment, the method 700 may further include changing, by the at least one processor 114, a scale of the displayed map 112 based on the scaling input. The determining the level in the hierarchy 104 (708) may include determining the level at which at least a portion of at least three places 300 are displayed on the map 112.

In an example embodiment, the method 700 may further include changing, by the at least one processor 114, a scale of the displayed map 112 based on the scaling input. The determining the level in the hierarchy 104 (708) may include determining the level at which at least a portion of all of the places 300 below one place 300, which is one level above the determined hierarchy 104, are displayed on the map 112.

In an example embodiment, the receiving the scaling input (706) may include the input 128 receiving a hierarchy input from the user, which the input processor 116 and/or hierarchy processor 120 may process. The determining the level in the hierarchy 104 (708) may include determining the level in the hierarchy 104 based on the hierarchy input.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   accessing, by at least one processor from at least one non-transitory computer-readable memory device, a map and a hierarchy of places included in the map, wherein:
   on the map, places at a same level in the hierarchy are non-overlapping with each other; and
   on the map, places in a lower level of the hierarchy are bounded by places in a higher level of the hierarchy;
   accessing, by the at least one processor from the at least one non-transitory computer-readable memory device, quantitative information associated with places in the hierarchy;
   generating, by the at least one processor based on a received scaling input, graphical data to display the map, the map including a first place at a first level in the hierarchy and at least a threshold number of other places at a second level in the hierarchy;
   determining, by the at least one processor based on the graphical data to display the map including at least a portion of at least the threshold number of other places at the second level in the hierarchy, to aggregate the quantitative information at the second level in the hierarchy for the threshold number of other places on the map;
   determining, by the at least one processor based on less available data for the first place on the map that is at the first level in the hierarchy, to aggregate the quantitative information for the first place on the map at the first level in the hierarchy, the second level being lower than the first level and the first place on the map being non-overlapping with the threshold number of other places;
   aggregating, by the at least one processor, the quantitative information for the first place at the first level based on the determining to aggregate the first place at the first level and for the threshold number of other places at the second level based on the determining to aggregate the threshold number of other places at the second level, the aggregating including independently aggregating the quantitative information associated with the first place at the first level and the threshold number of other places at the second level; and adding, by the at least one processor, to the graphical data to display the map, an indication of the aggregated quantitative information for the first place and for each of the threshold number of other places.

2. The method of claim 1, wherein the accessing the hierarchy of places and the accessing the quantitative information associated with the places includes accessing an object associated with each of the places, each of the objects including:
a level attribute indicating a level of the place within the hierarchy; and
a quantitative information attribute indicating the quantitative information associated with the place.

3. The method of claim 1, wherein the accessing the hierarchy of places and the accessing the quantitative information associated with the places includes accessing an object associated with each of the places, each of the objects including:
a relations attribute indicating at least one other place above or below the place in the hierarchy; and
a quantitative information attribute indicating the quantitative information associated with the place.

4. The method of claim 1, wherein the hierarchy is based on political boundaries on the map.

5. The method of claim 1, wherein the places include geographic locations on the map.

6. The method of claim 1, wherein the quantitative information includes sales data.

7. The method of claim 1, further comprising receiving the scaling input from a user via a graphical user interface.

8. The method of claim 1, wherein the aggregating includes adding the quantitative information for the threshold number of other places at the second level, the adding including independently adding the quantitative information associated with places below at least two of the threshold number of other places at the second level.

9. The method of claim 1, wherein the indication of the aggregated information includes a number within the portion of the place on the map for which the information was independently aggregated.

10. The method of claim 1, further comprising:
changing, by the at least one processor, a scale of the displayed map based on the received scaling input,
wherein the determining the second level in the hierarchy includes determining the level at which the threshold number of the places are displayed on the map.

11. The method of claim 1, further comprising:
changing, by the at least one processor, a scale of the displayed map based on the received scaling input,
wherein the determining the second level in the hierarchy includes determining the level at which at least two of the places are displayed on the map.

12. The method of claim 1, further comprising:
changing, by the at least one processor, a scale of the displayed map based on the received scaling input,
wherein the determining the second level in the hierarchy includes determining the level at which at least three of the places are displayed on the map.

13. The method of claim 1, further comprising:
changing, by the at least one processor, a scale of the displayed map based on the received scaling input,
wherein the determining the second level in the hierarchy includes determining the level at which all of the places are displayed on the map.

14. The method of claim 1, wherein:
the method further includes receiving a hierarchy input from a user.

15. A computer program product comprising a non-transitory computer readable storage medium comprising instructions that, when executed by at least one processor, cause a computing apparatus to:
access a map and a hierarchy of places included in the map, wherein:
on the map, places at a same level in the hierarchy are non-overlapping with each other; and
on the map, places in a lower level of the hierarchy are bounded by places in a higher level of the hierarchy;
access quantitative information associated with the places in the hierarchy;
generate, based on a received scaling input, graphical data to display the map, the map including a first place at a first level in the hierarchy and at least a threshold number of other places at a second level in the hierarchy;
determine, based on the graphical data to display the map including at least a portion of at least the threshold number of places at the second level in the hierarchy, to aggregate the quantitative information at the second level in the hierarchy for the threshold number of other places on the map;
determine, based on less available data for the first place on the map that is at the first level in the hierarchy, to aggregate the quantitative information for the first place on the map at the first level in the hierarchy, the second level being lower than the first level and the first place on the map being non-overlapping with the threshold number of other places;
aggregate the quantitative information for the first place at the first level based on the determining to aggregate the first place at the first level and for the threshold number of other places at the second level based on the determining to aggregate the threshold number of other places at the second level, the aggregating including independently aggregating the quantitative information associated with the first place at the first level and the threshold number of other places at the second level; and
add, to the graphical data to display the map, an indication of the aggregated quantitative information for the first place and for each of the threshold number of other places.

16. The computer program product of claim 15, wherein the accessing the hierarchy of places and the accessing the quantitative information associated with the places includes accessing an object associated with each of the places, each of the objects including:
a level attribute indicating a level of the place within the hierarchy;
a relations attribute indicating at least one other place above or below the place in the hierarchy; and
a quantitative information attribute indicating the quantitative information associated with the place.

17. The computer program product of claim 15, wherein the aggregating includes independently adding the quantitative information associated with places below the threshold number of other places at the second level.

18. A computing system comprising:
at least one processor; and
a non-transitory computer readable storage medium comprising instructions stored thereon that, when executed by the at least one processor, cause the computing system to:
access a map and a hierarchy of places included in the map, wherein:
on the map, places at a same level in the hierarchy are non-overlapping with each other; and on the map, places in a lower level of the hierarchy are bounded by places in a higher level of the hierarchy;
access quantitative information associated with the places in the hierarchy;
generate, based on a received scaling input, graphical data to display the map, the map including a first place at a first level in the hierarchy and at least a threshold number of other places at a second level in the hierarchy;
determine, based on the graphical data to display the map including at least a portion of at least the threshold number of other places at the second level in the hierarchy, to aggregate the quantitative information at the second level in the hierarchy for the threshold number of other places on the map;
determine, based on less available data for the first place on the map that is at the first level in the hierarchy, to aggregate the quantitative information for the first place on the map at the first level in the hierarchy, the second level being lower than the first level and the first place on the map being non-overlapping with the threshold number of other places;
aggregate the quantitative information for the first place at the first level based on the determining to aggregate the first place at the first level and for the threshold number of other places at the second level based on the determining to aggregate the threshold number of other places at the second level, the aggregating including independently aggregating the quantitative information associated with the first place at the first level and the threshold number of other places at the second level; and
add, to the graphical data to display the map, an indication of the aggregated quantitative information for the first place and for each of the threshold number of other places.

* * * * *